United States Patent
Visvanathan et al.

(10) Patent No.: US 10,095,624 B1
(45) Date of Patent: Oct. 9, 2018

(54) INTELLIGENT CACHE PRE-FETCH

(71) Applicant: EMC IP Holding Company LLC, Hopkinton, MA (US)

(72) Inventors: Satish Kumar Kashi Visvanathan, San Jose, CA (US); Rahul Ugale, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/581,785

(22) Filed: Apr. 28, 2017

(51) Int. Cl.
 *G06F 12/08* (2016.01)
 *G06F 12/0862* (2016.01)

(52) U.S. Cl.
 CPC .. *G06F 12/0862* (2013.01); *G06F 2212/1021* (2013.01); *G06F 2212/1024* (2013.01); *G06F 2212/222* (2013.01); *G06F 2212/401* (2013.01); *G06F 2212/6026* (2013.01)

(58) Field of Classification Search
 CPC .................................................. G06F 12/0862
 USPC ........................................................ 711/137
 See application file for complete search history.

(56) References Cited

U.S. PATENT DOCUMENTS

| | | | | |
|---|---|---|---|---|
| 2002/0144054 | A1* | 10/2002 | Fanning | G06F 12/0862 711/108 |
| 2008/0133855 | A1* | 6/2008 | Jeong | G06F 12/0802 711/161 |
| 2014/0201442 | A1* | 7/2014 | Rajasekaran | G06F 12/0804 711/119 |
| 2017/0371792 | A1* | 12/2017 | Oportus Valenzuela | G06F 12/0871 |

\* cited by examiner

*Primary Examiner* — Than Nguyen
(74) *Attorney, Agent, or Firm* — Womble Bond Dickinson (US) LLP

(57) ABSTRACT

An intelligent cache pre-fetch system includes a pre-fetch throttling scheme to monitor a cache hit rate context. Pre-fetch reads of additional data are only launched when the context is below a given threshold. A pre-fetch read of additional data can be selectively initiated after determining that references to neighboring segments related to a compression region already in memory are not yet present in the cache. Additional throttling of pre-fetch reads can be accomplished by only initiating the selective pre-fetch of additional data after determining whether the compression region to which the neighboring segments are related is a hot region, where a hot region is characterized as a compression region having data that is accessed frequently as compared to data in other compression regions.

20 Claims, 6 Drawing Sheets

INTELLIGENT CACHE PRE-FETCH

FIELD OF THE INVENTION

Embodiments of the present invention relate generally to data storage systems. More particularly, embodiments of the invention relate to managing a cache for data storage systems.

BACKGROUND

Primary storage with integrated protection, referred to as PIP storage, reduces storage costs and reduces the time for backup creation and restoration because of its integrated design. A single PIP storage may utilize any type of non-volatile storage medium such as flash memory, PCIe-connected flash memory, solid state device (SSD), magnetic tape, and magneto-optical (MO) storage media to take advantage of different cost performance characteristics of different non-volatile storage medium.

For example, SSDs can deliver about 500× more input/output operations per second (IOPS) than spinning disk but also have 5× the cost. SSDs, as well as other forms of flash memory, have a limited number of write-erase cycles after which a given region of memory cannot be rewritten.

To obtain the best performance, the architecture of a typical PIP storage system uses a tiered infrastructure, including a larger lower cost and lower performance medium such as hard drive disk storage medium (HDD), and a smaller cache/tier layer of a higher cost and higher performance storage medium (SSD). The challenge is to build the tiered infrastructure economically and with high performance. Typically, HDD is used to provide a bottom layer of large capacity disk storage, and SSD is used to provide a middle layer of cache memory, referred to as data cache.

Data cache accelerates performance, including improving the read latency of primary-like application access in Instant Access/Instant Recovery (IA/IR) use cases. Primary-like application access typically refers to frequent access to approximately 20 percent of data and less frequent access to the remaining 80 percent of data.

One technique for improving performance in tiered storage systems is to use pre-fetching, in which blocks of data are read in advance and loaded into the data cache in anticipation of future potential reads of those blocks of data. In storage systems with ample data cache capacity, pre-fetching and loading more data into cache in a high performance cache memory device such as SSD can be beneficial because it can increase efficiency through an increase in the cache hit rate.

But pre-fetching can also be detrimental in tiered storage systems because it can increase disk Input/Output (TO) operations at the lower performance HDD layer. For example, in virtual machines with integrated data protection (VMIDP) or storage appliances with integrated data protection, such as Data Domain Virtual Edition (DDVE)® appliances from EMC® Corporation, pre-fetching data from low spindle count HDDs can potentially cause I/O operation timeouts.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
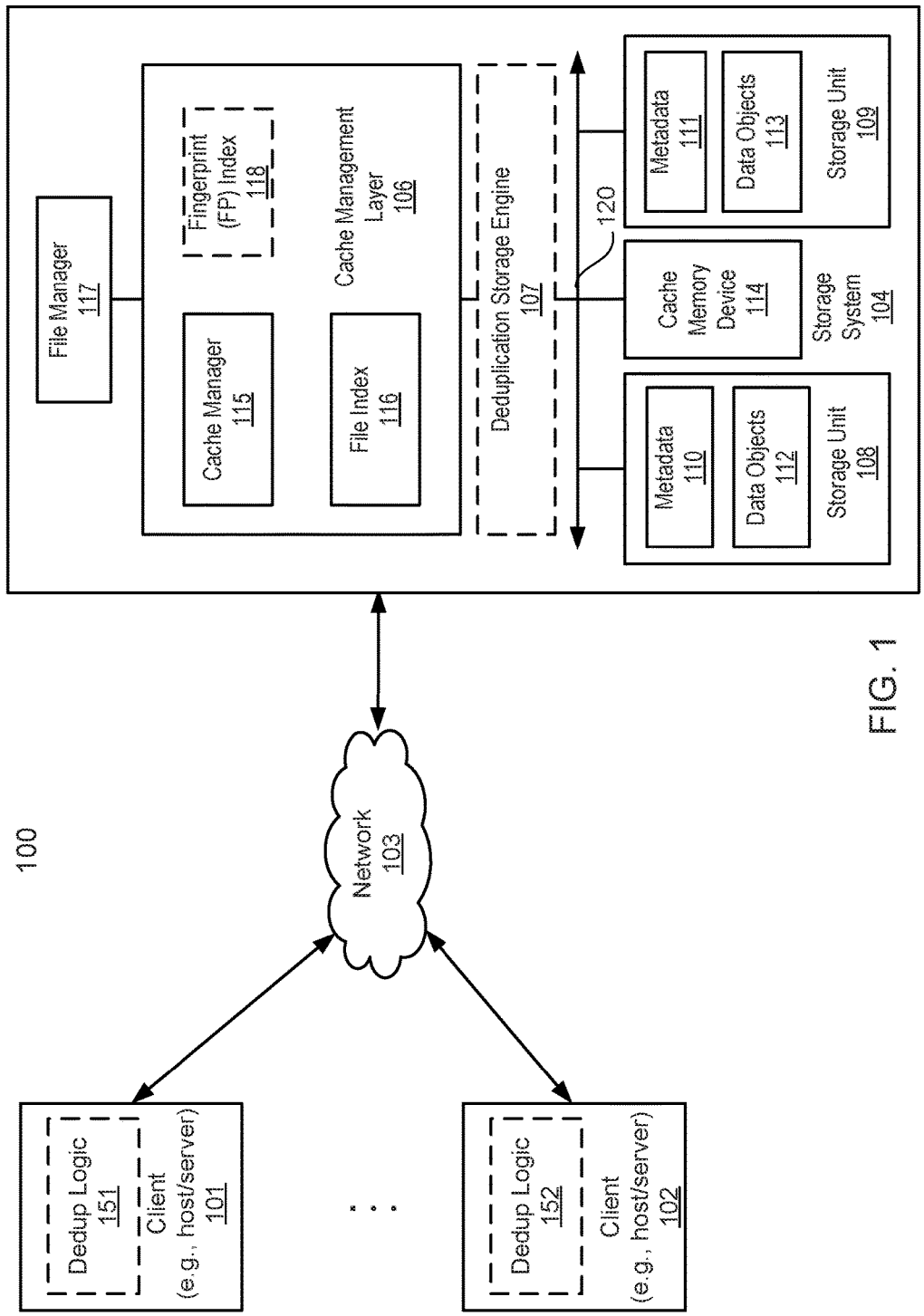
FIG. 1 is a block diagram illustrating a storage system with cache management for intelligent cache pre-fetch according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Although cache read misses will eventually populate the data cache, eliminating pre-fetch to avoid I/O operation timeouts can impact cache performance at startup. However, because many applications typically request data blocks above 32 k for IA/IR use cases, the locality of the data is generally high, and the worst case locality of 8 k is rare.

For example, in VMIDP systems with low deduplication, files in compression regions are not likely to get mixed in with other files due to GC copy forward, resulting in less fragmentation. In this type of scenario pre-fetching data from compression regions will likely have a beneficial effect on cache performance without unnecessarily impacting disk I/O on the lower performance HDD layer because the data has good temporal locality and segments in the pre-fetched compression regions will likely be related to a file the application has already accessed and may need to access again.

On the other hand, if locality of a compression region load is poor, pre-fetching is less likely to be beneficial since the segments loaded to cache might not be useful to the application. The challenge is to distinguish between the different scenarios and only employ pre-fetching when it is most likely to have a beneficial effect on cache performance without impacting disk I/O.

To address the challenge of determining when best to employ pre-fetching to improve cache performance, an intelligent cache pre-fetch system is herein described. In one embodiment, an intelligent cache pre-fetch system includes a pre-fetch throttling scheme to monitor a cache hit rate context, and only launch a pre-fetch read of additional data when the context is below a given threshold.

In one embodiment, a pre-fetch read of additional data can be selectively initiated after determining that references to neighboring segments related to a compression region already in memory are not yet present in the cache.

In one embodiment, the intelligent cache pre-fetch system includes additional throttling by only initiating the selective pre-fetch of additional data after determining whether the compression region to which the neighboring segments are related is a hot region, where a hot region is characterized as a compression region having data that is accessed frequently as compared to other regions.

For integrated data protection systems with a smaller amount of the lower performance HDD layer storage, intelligent cache pre-fetch advantageously increases the efficiency of data cache performance without unnecessarily impacting disk I/O.

FIG. 1 is a block diagram illustrating a storage system in which intelligent cache pre-fetch can be implemented according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may be used as any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, file manager 117, cache management layer 106, deduplication storage engine 107, storage units 108-109, and cache memory device (or simply referred to as cache) 114 communicatively coupled to each other. Storage units 108-109 and cache 114 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. Note the terms "cache memory device" and "cache" are used interchangeably within the specification, and a cache memory device can be volatile or non-volatile devices.

In one embodiment, a processor is configured to execute a file manager 117 to provide an interface to access files stored in storage units 108-109 and cache 114. In one embodiment, a cache management layer 106 is configured with a cache manager 115, file index 116, and optionally fingerprint (FP) index 118. In one embodiment, a processor is configured to execute the cache manager 115 to perform processes for intelligent cache pre-fetch. Cache management layer 106 and file manager 117 reside in memory of a processor in one embodiment.

In one embodiment, file index 116 is used to access data cached in cache memory device 114. Fingerprint index 118 is used to deduplicate the data stored in cache memory device 114. When data such as data objects 112-113 is accessed in the underlying storage system, the data may be cached in cache memory device 114, in this example, a non-volatile memory device such as a solid state drive (SSD) or other flash memory device. In response to receiving a request to cache a file extent of a file, its fingerprint is generated and used by cache manager 115 to look up in the fingerprint index 118 to determine whether any fingerprint entry matching the fingerprint is found. If so, that means the corresponding data has already been stored in the cache memory device 114 as a file extent. The file is associated with the storage location that caches the file extent by creating or inserting a file extent entry into the file index 116.

According to one embodiment of the invention, the fingerprint index 118 is a partial index that only covers portions of the file extents stored in the cache memory device 114. An efficient insertion and eviction mechanism is employed to maintain the fingerprint index in a relatively small size. A variety of replacement policies can be utilized to determine which of the file fingerprint entries should be inserted or evicted from the fingerprint index 118.

According to one embodiment, the cache management layer 106 uses other insertion and eviction policies to determine which file extents should be kept in the cache and referenced by the file index 116. In one embodiment, each of the file extent entries in the file index 116 may be associated with a list of one or more linked nodes that collectively represent a file extent. Each node includes a bitmap having multiple bits, each corresponding to one of the data blocks within the corresponding extent associated with the node. The bitmap is to indicate which of the data blocks within the file extent are valid.

According to another embodiment of the invention, some of the fingerprints of the underlying deduplicated storage system (e.g., fingerprints as part of metadata 110-111) are shared with and utilized by the fingerprint index 118 of the cache management layer 106.

According to one embodiment, the file extents cached in the cache memory device 114 are compressed into a WEU together with some other file extents from the same file or different files. The WEU is then stored in the cache memory device and evicted in accordance with embodiments of intelligent cache pre-fetch as described herein.

In one embodiment, the size of a WEU may match an erasure unit size of that particular cache memory device 114. When storing data into the cache memory device 114, an entire WEU is written or evicted to improve the lifespan of the cache memory device 114, and to improve data cache performance in accordance with embodiments of intelligent cache pre-fetch as described herein.

In one embodiment, when accessing data stored in the cache memory device 114, a file extent is read. In some embodiments, a file extent is significantly smaller than a WEU, which reduces the amount of excess data read to satisfy a request. In some embodiments, a file extent is the unit of compression so that only a file extent needs to be read in order to decompress and return the requested data that is part of that file extent.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 is configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

The operations of storing file data in the cache memory device 114 are discussed in detail herein below. For storing file data in storage units 108-109, deduplication storage engine 107 is configured to segment the file data into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of file data are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

In one embodiment, storage system 104 further includes a storage manager or storage controller (not shown) configured to manage storage resources of storage system 104, such as, for example, storage space and processing resources (e.g., processor, memory, network resources). An administrator of management console or server may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
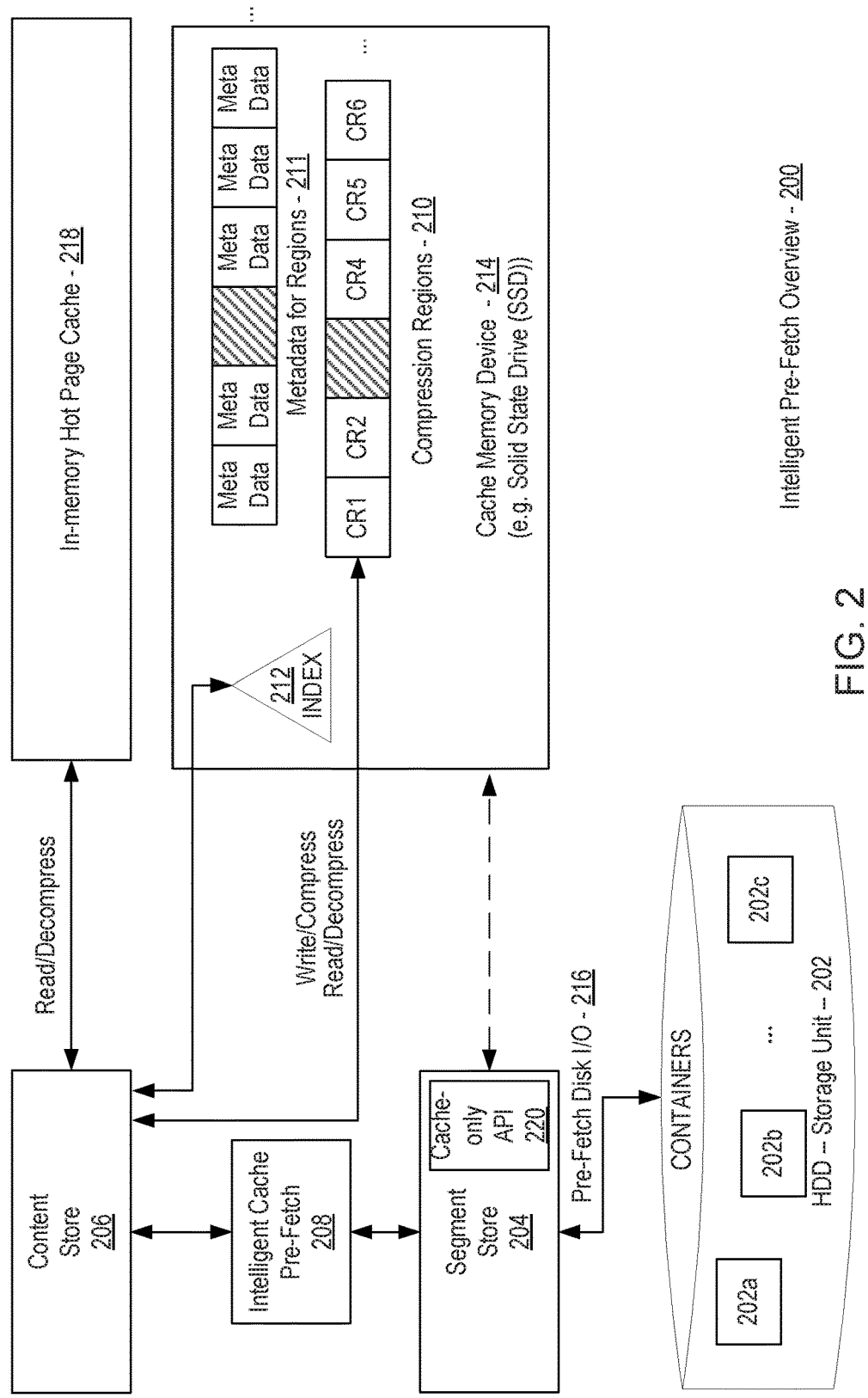
FIG. 2 is a block diagram illustrating data cache components of a storage system with cache management for intelligent cache pre-fetch in further detail according to one embodiment of the invention.

FIG. 2 is a block diagram illustrating further details of storage system 104 (FIG. 1) with which embodiments of intelligent cache pre-fetch can be implemented.

In the illustrated overview 200 of intelligent cache pre-fetch and in accordance with one embodiment, data stored in containers 202a-202c in HDD storage unit 202, such as deduplicated data, are accessed through operations of a segment store 204 and a content store 206. To improve performance, data obtained from containers 202 in the data store are cached in a cache memory device 214, such as an SSD, in the form of compression regions 210 composed of a plurality of compression regions CR1, CR2, CR4, CR5, CR6 . . . that may or may not have good locality, i.e. that may or may not contain segments related to already accessed data such as a particular file.

In one embodiment, the compression regions 210 are accessible via index 212 using, for example, a fingerprint index (not shown) that corresponds to metadata for the compressed regions 211, also stored in the cache memory device 214. The cached data in compression regions 210 is written and read from content store 206. Frequently and recently used pages of data can be stored temporarily in memory in a hot page cache 218 for faster read access.

In one embodiment, during regular operation, the content store 206 queries the segment store 204 to determine whether a requested segment is already in memory. If not, then the segment store 204 will check the index 212 to determine whether the requested segment is cached in the cache memory device 214, referred to as a cache hit. If not, referred to as a cache miss, the segment store 204 will then obtain the requested data from containers in storage unit 202 via a regular read disk I/O. Throughout operation the cache memory device 214 hit counts and recency statistics are accumulated as will be described in further detail below.

In one embodiment, an intelligent cache pre-fetch component 208 is interposed between the content store 206 and the segment store 204 to carry out the intelligent pre-fetch operations to complement the regular read operations. In one embodiment, to facilitate the determination of whether to employ pre-fetching, the segment store 204 is configured with a cache-only application programming interface (API) 220.

In one embodiment, the cache-only API 220 processes requests from the content store 206 via the intelligent cache pre-fetch component 208 to look up whether contiguous references surrounding a completed read batch of compression regions are available via the segment store 204. If so, the data for those contiguous references can be returned to the content store 206 for compression and storage in the data cache memory device 214 in the appropriate WEU. If not, then the intelligent cache pre-fetch component 208 can avoid a potential cache miss by launching a pre-fetch read call to the segment store 204 to trigger a pre-fetch disk I/O 216 in order to populate the data cache memory device 214 with data for the contiguous references in advance of anticipated reads for that data.

By way of example only and for ease of illustration, with reference to FIG. 2 the intelligent cache pre-fetch component 208 can launch a pre-fetch read call to the segment store 204 to read a missing CR3 compression region that is likely to contain data related to references surrounding an already completed read batch of compression regions CR2 or CR4. In one embodiment, looking up the contiguous references is determined through accessing the corresponding metadata 211 for the completed read batch of compression regions 210.

Figure 3:
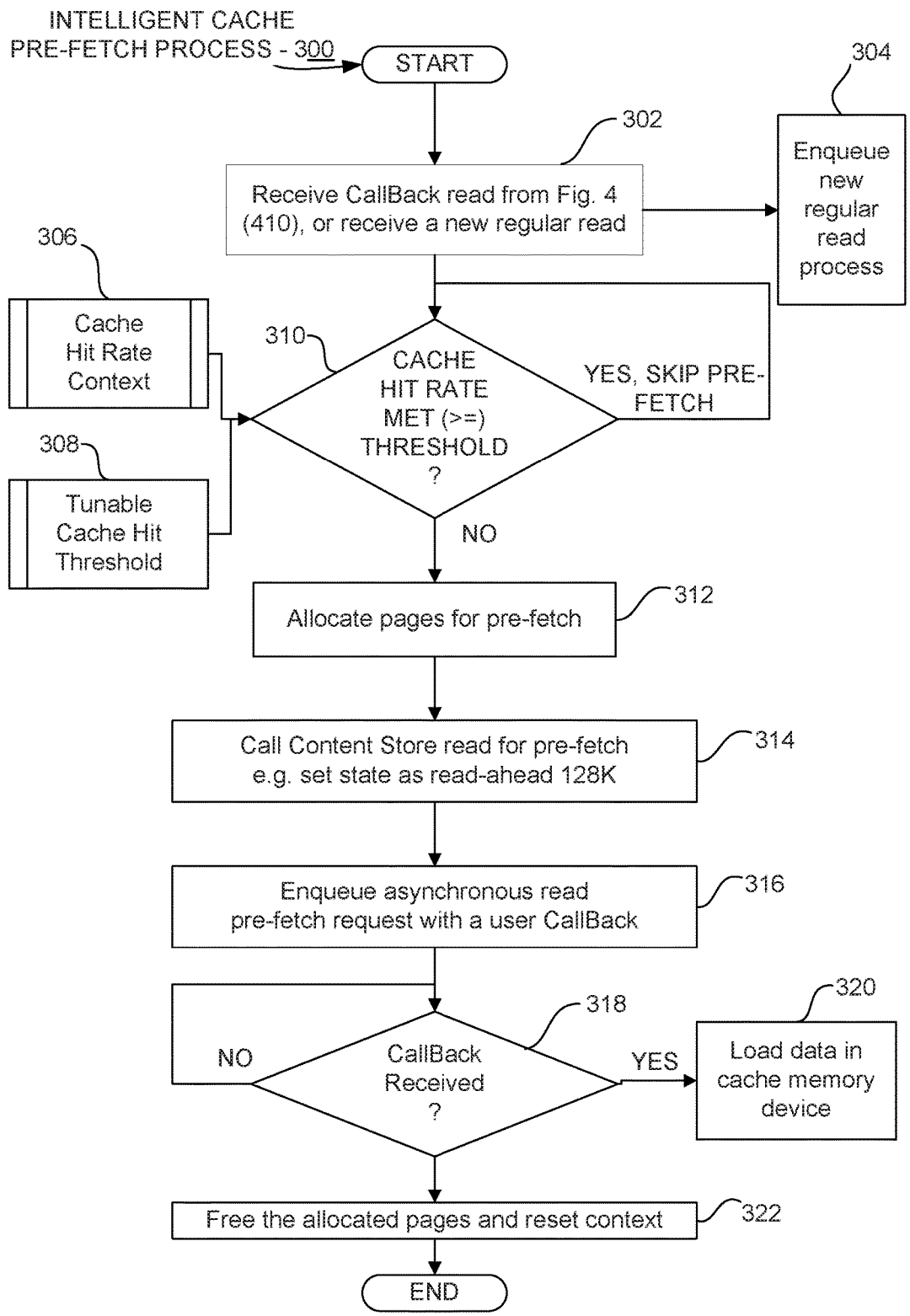
FIG. 3 is a flow diagram illustrating an intelligent cache pre-fetch process according to one embodiment of the invention.

FIG. 3 is a flow diagram illustrating an intelligent cache pre-fetch process 300 according to one embodiment of the invention. At 302, a content store 206 (FIG. 2) receives either a regular new read request from an application or a CallBack read triggered from a completed read batch as will be described in further detail in FIG. 4. At 304, the regular read is enqueued to a regular read process. For either type of read, at decision 310 the intelligent cache pre-fetch component 208 interrogates the cache hit rate context 306 and tunable cache hit threshold 308 to determine whether to skip pre-fetching or initiate pre-fetching.

In one embodiment, the cache hit rate context 306 is continuously monitored by tracking the ratio of cache hits to cache misses during a predetermined window of time. For example, a particular processing stream could have experienced a high global cache hit rate in the past but has now become inactive. When the stream returns most of the blocks may have already been evicted due to the inactivity. The evicted blocks can cause the cache hit rate for the new window to decline. For this reason, the cache hit rate is continuously monitored to maintain and warm up (increase) the cache hit rate faster. Thus, in one embodiment, if the cache hit rate is sufficiently high, then pre-fetching can be skipped to avoid unnecessarily impacting the disk I/O of the lower performance HDD layer.

In one embodiment, in order to continuously monitor the cache hit rate context 306, hit and miss information is maintained for each processing stream for a specific monitoring window of time (e.g. 1 minute). If the cache hit rate for that recent window of time is above a predetermined threshold (e.g. 70 percent cache hit rate) the pre-fetching that might otherwise have been triggered by a new read or by a CallBack read (FIG. 4) can be skipped, or possibly performed only if the compression region is deemed hot.

In one embodiment, the threshold 308 is implemented as a system parameter along with the amount of time for the monitoring window. The monitoring statistics from which the cache hit rate context 306 are derived can be retrieved on entry to the content store 206. In one embodiment, the pre-determined threshold at which to throttle prefetching is typically tuned to start with a relatively high 70% hit rate since it is likely that a primary-like application load of 20% working set should reach a 70% hit rate. In one embodiment, the cache hit rate is adapted dynamically on a per stream level of granularity by comparing the current cache hit ratio with cache hit ration achieved by other consumers during the same or similar processing window.

In one embodiment, further specificity in the decision to throttle can be based on a supported stream count for random I/O reads to ensure that if there is sufficient disk I/O capacity the process 400 continues to proceed with pre-fetch read operations until achieving a cache hit ratio of 100%. In a typical embodiment, further specificity in the decision to throttle is an optimization feature since, in most situations, achieving a cache hit rate context of 70% is reasonably sufficient. In that context subsequent pre-fetches are best avoided since during regular operation cache misses already trigger the additional new read operations to bring the missing data into the data cache.

In this manner, the pre-fetching (and thus potential disk I/O) can be throttled when cache hit rates are rising and pre-fetching is not needed, but allowed to complete when cache hit rates are low and populating the data cache with additional data would likely be beneficial.

In one embodiment, and by way of illustration only, a coding example for implementing the monitoring process is as follows:

Per_Stream_init( )
starttime—0
curr_hit_cnt=curr_miss_cnt=window_hit_cnt=window_miss_cnt=0
Per_stream_read( )
   If    starttime=0;    starttime=curr_time(   );
      curr_hit_cnt=curr_miss_cnt=0
if cache lookup
   curr_hit_cnt++
else
   curr_miss_cnt++
Cache_hit_rate=window_hit_cnt/(window_hit_cnt+window_miss_cnt)*100;
if (curr_time( )–starttime)>=1 min
   starttime=curr_time( )
   window_hit_cnt=curr_hit_cnt;
Window_miss_cnt=Curr_miss_cnt
   curr_hit_cnt=0;
   curr_miss_cnt=0;
}
If (cache_hit_rate<hit_threshold) perform prefetch to load cache aggressively
Else
Skip prefetch, update a stat to indicate skip due to good window cache hit.

Continuing with reference to FIG. 3, in one embodiment, should it be determined that it is beneficial to allow the pre-fetch read operation to proceed, at 312 the process 300 allocates pages for the pre-fetch and at 314 initiates a call to the content store 206 to begin the pre-fetch read operation, e.g. by setting the state of the all as a read ahead call for a particular block of data, such as 128K of data in anticipation of reading compression regions with good temporal locality.

At 316, the segment store 204 enqueues the asynchronous read pre-fetch request with a user CallBack. At 318, once the CallBack is received, the data is stored 320 in the cache memory device 214. At 322, the process 300 concludes by freeing up the allocated pages and resetting the context window for determining the cache hit rate context 306.

Figure 4:
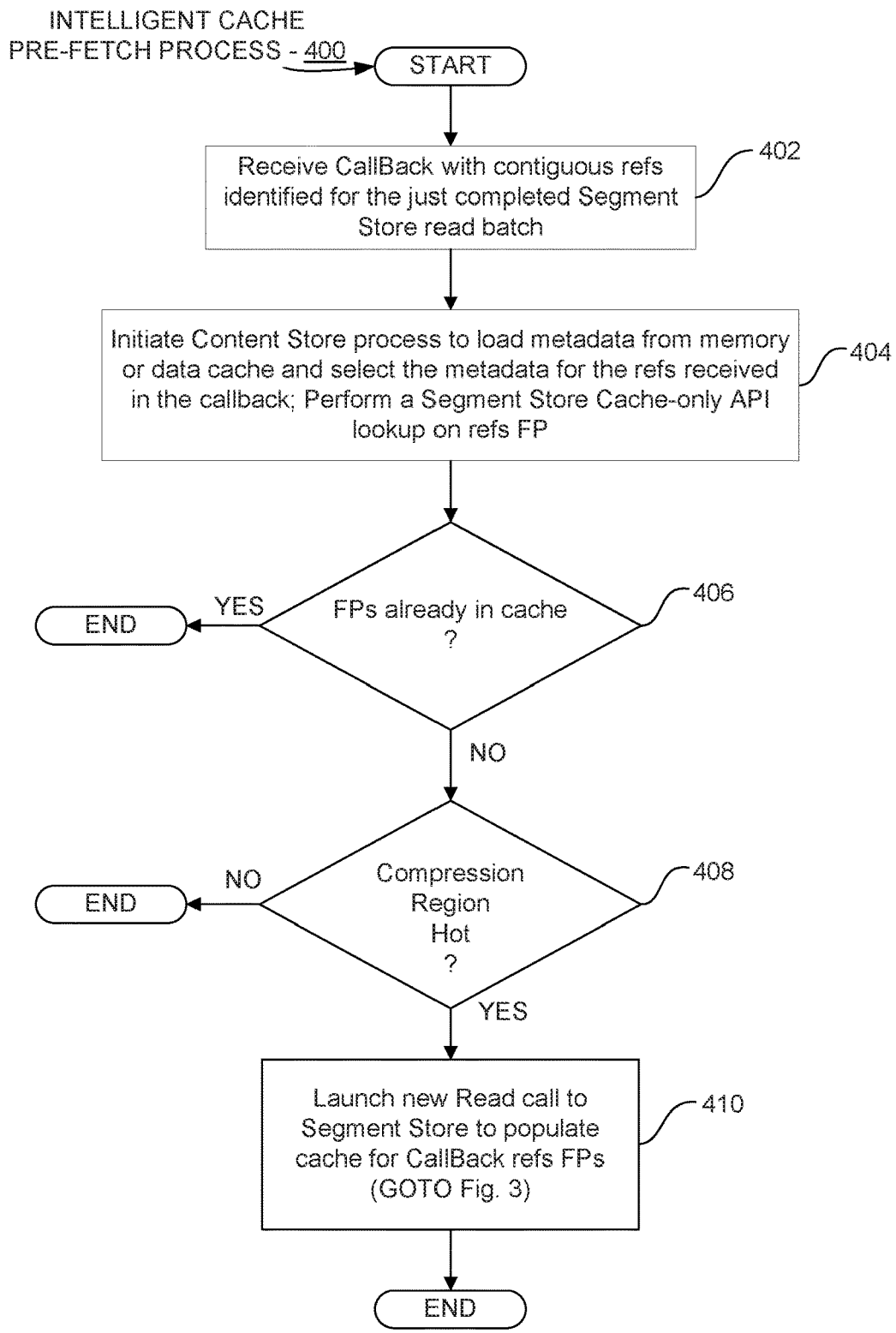
FIG. 4 is a flow diagram illustrating another intelligent cache pre-fetch process according to one embodiment of the invention.

FIG. 4 is a flow diagram illustrating another intelligent cache pre-fetch process 400 according to one embodiment of the invention. In process 400 a pre-fetch read of additional data can be selectively initiated after determining that references to neighboring segments related to a compression region already in memory are not yet present in the cache.

Because it is not always possible at the segment store 204 layer to associate segments to a file or to walk all the references found in a file to check if they are present in a loaded compression region, one approach to determine whether useful data is available in the compression region for a particular file is to search for references and segments that surround the read compression region.

For example, by initiating a lookup of metadata for an L1 segment and its neighbor, one can determine whether an application is likely to have created data with good locality, such as by causing a big chunk of data to be written, but reading back smaller portions of that data. In one embodiment, the segment store can aid in the process of determining locality by passing (e.g. in a CallBack of the read operation) a list of references in a particular compression region to allow the intelligent cache pre-fetch process to lookup whether those references belong to the file being read.

In view of the foregoing, with reference to FIG. 4 at 402, in one embodiment the process 400 receives a CallBack with contiguous references identified for the just completed segment store read batch. At 404 the process 400 continues by initiating a content store process to load metadata from memory or the dtata cache and select the metadata for the references received in the callback. Using this information, the process 400 interfaces with a segment store cache-only API that can perform a lookup on the fingerprints FP for the references to determine at 406 whether the FPs are already in the data cache. If so, then there is no reason to pursue additional pre-fetch read operations as the data is already in the data cache and the process 400 ends.

In one embodiment, if there are no corresponding FPs already in the data cache, then at 408, the process 400 determines whether the compression region from which the contiguous references were identified is a hot region, i.e. one that is frequently accessed by the application's working set. If not, then the pre-fetch read operation is skipped to throttle any unnecessary disk I/O. But if the compression region is hot, then process 400 at 410 launches a new read call to the segment store 204 to populate the cache for the CallBack references by their FPs, as incurring the additional disk I/O cost to the HDD layer will likely be outweighed by the beneficial effect on the future performance of the data cache memory layer by increasing the data cache hit rate.

In the foregoing description note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
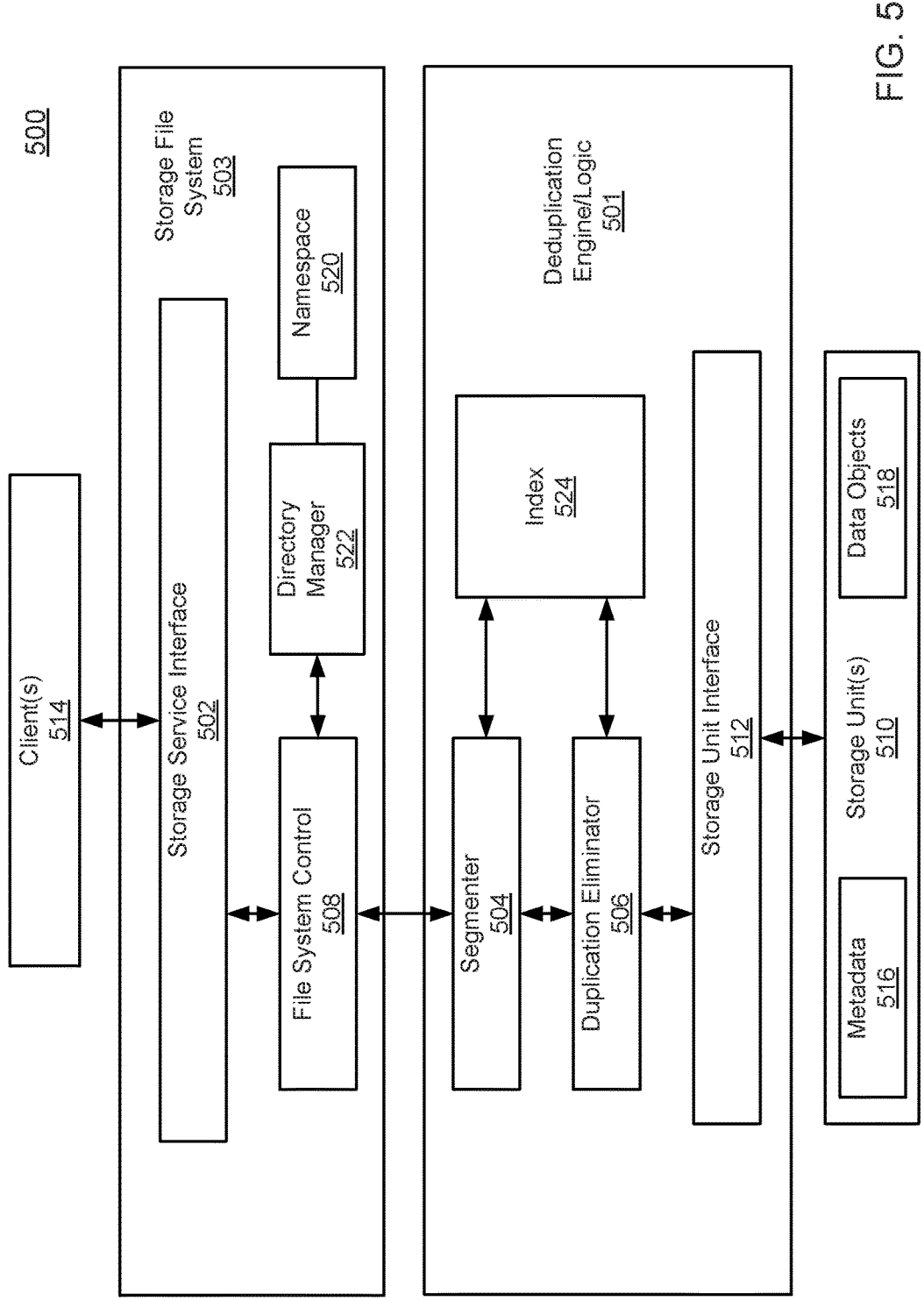
FIG. 5 is a block diagram illustrating a general example of a storage system in which cache management for intelligent cache pre-fetch can be implemented according to one embodiment of the invention.

FIG. 5 is a block diagram illustrating a deduplication storage system according to one embodiment of the invention. For example, deduplication storage system 500 is implemented as part of the storage system 500 as described above, such as, for example, the deduplication storage system as a client and/or a server described above. In one embodiment, storage system 500 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 500 may have a distributed architecture, or all of its components may be integrated into a single unit. Storage system 500 may be implemented as part of an archive and/or backup system, or a disaster recovery system, such as a deduplicating storage system available from EMC® Corporation of Hopkinton, Mass.

In one embodiment, storage system 500 includes deduplication logic 501 interfacing one or more clients 514, via file system 503, with one or more storage units 510 storing metadata 516 and data objects 518. Clients 514 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 510 may be implemented locally (e.g., single node operating environment) or remotely (e.g., multi-node operating environment) via an interconnect, which may be a bus and/or a network (e.g., a storage network). In one embodiment, one of storage units 510 operates as an active storage to receive and store external or fresh user data from a client (e.g., an end-user client or a primary storage system associated with one or more end-user clients), while the another one of storage units 510 operates as a target storage unit to periodically archive data from the active storage unit according to an archiving policy or scheme.

Storage units 510 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 510 may also be combinations of such devices. In the case of disk storage media, the storage units 510 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 516, may be stored in at least some of storage units 510, such that files can be accessed independent of another storage unit. Metadata of each storage unit includes enough information to provide access to the files it contains. In one embodiment, metadata may include fingerprints or representatives contained within data objects 518, where a data object may represent a data segment (also referred to as a data chunk), a compression region (CR) of one or more data segments, or a container of one or more CRs. Fingerprints are mapped to a particular data object via metadata 516, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 516 may include a file name, a storage unit identifier (ID) identifying a storage unit in which the segments associated with the file name are stored, reconstruction information for the file using the segments, and any other appropriate metadata information. Metadata 516 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 503 includes file service interface 502, file system control logic 508, directory manager 522, and namespace 520. Deduplication logic 501 includes segmenter 504 (also referred to as a segmenting module or unit), duplication eliminator 506, and storage unit interface 512. File system control 508 receives a file or files (or data item(s)) via file service interface 502, which may be part of a file system namespace 520 of file system 503 associated with the deduplication logic 501. The file system namespace 520 refers to the way files are identified and organized in the system. An example is to organize the files hierarchically into directories or folders, which may be managed by directory manager 522. File service interface 512 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 504 and file system control 508. Segmenter 504, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 508, also referred to as a file system manager, processes information to indicate the segment(s) association with a file. In some embodiments, a list of fingerprints is used to indicate segment(s) associated with a file. File system control 508 passes segment association information (e.g., representative data such as a fingerprint) to index 524. Index 524 is used to locate stored segments in storage units 510 via storage unit interface 512. In one embodiment, index 524 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 524 maps a fingerprint of a segment to a container identifier identifying a container that contains the corresponding segment.

In one embodiment, index 524 includes a persistent hash-table of segment-IDs keyed either by the digest of the data stored in the segment or by the deduplication key of the data stored in the segment. The index 524 need not contain entries for every data segment in the deduplication domain, but the effectiveness of deduplication is a function of the number of entries stored in the index 524. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 524) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 506, also referred to as a segment store, identifies whether a newly received segment has already been stored in storage units 510. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 510 that make up the file. Segments are then packed by a container manager (which may be implemented as part of storage unit interface 512) into one or more storage containers stored in storage units 510. The deduplicated segments may be further compressed into one or more CRs using a variation of compression algorithms, such as a Lempel-Ziv algorithm before being stored. A container may contain one or more CRs and each CR may contain one or more deduplicated segments (also referred to as deduplicated segments). A container may further contain the metadata such as fingerprints, sketches, type of the data segments, etc. that are associated with the data segments stored therein.

When a file is to be retrieved, file service interface 502 is configured to communicate with file system control 508 to identify appropriate segments stored in storage units 510 via storage unit interface 512. Storage unit interface 512 may be implemented as part of a container manager. File system control 508 communicates (e.g., via segmenter 504) with index 524 to locate appropriate segments stored in storage units via storage unit interface 512. Appropriate segments are retrieved from the associated containers via the container manager and are used to construct the requested file. The file is provided via interface 502 in response to the request. In one embodiment, file system control 508 utilizes a tree (e.g., a segment tree obtained from namespace 520) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 500 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 501) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
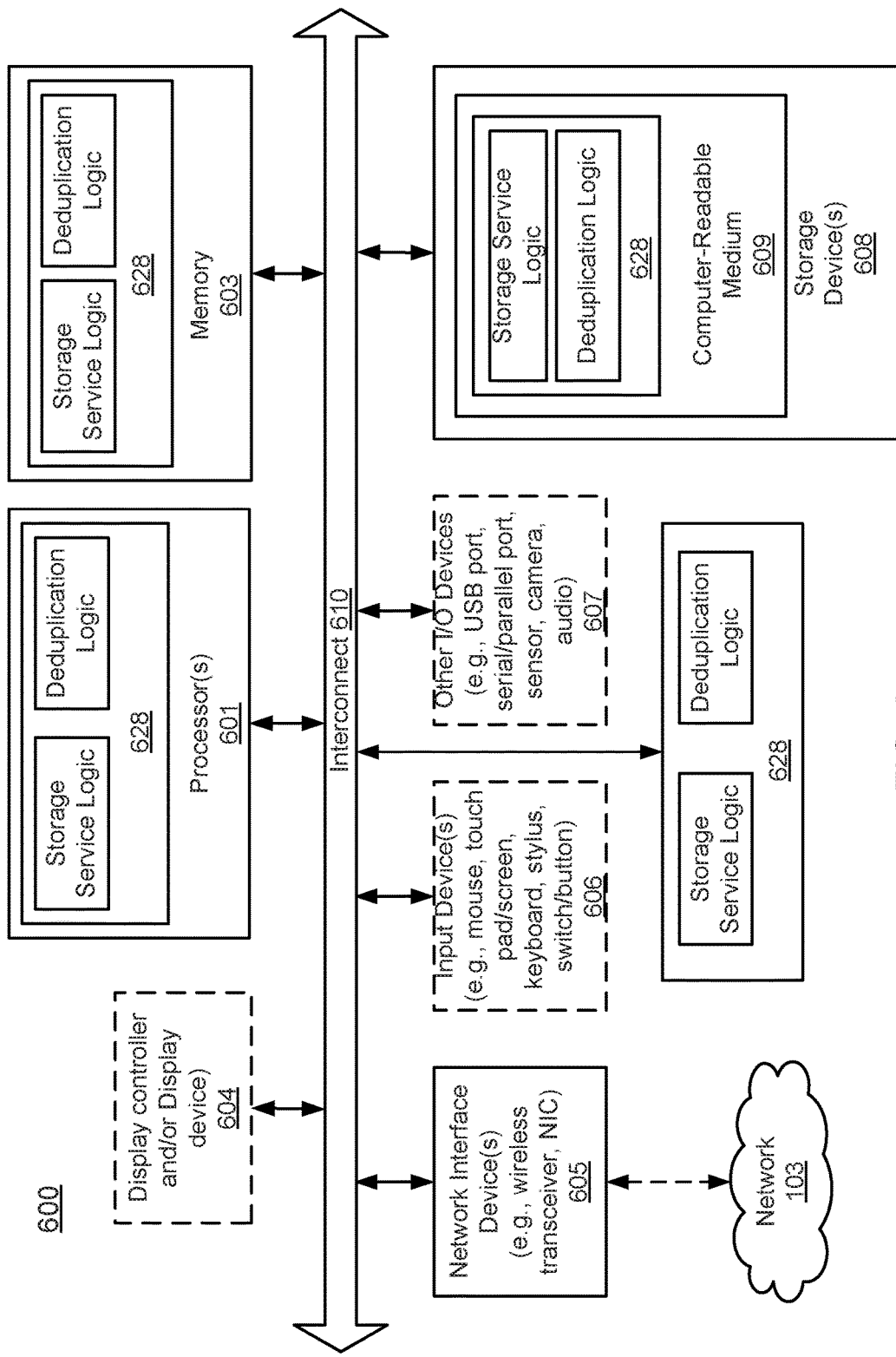
FIG. 6 is a block diagram illustrating a data processing system in which cache management for intelligent cache pre-fetch can be implemented according to one embodiment of the invention.

FIG. 6 is a block diagram illustrating an example of a data processing system that may be used with one embodiment of the invention. For example, system 600 may represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem, which may include a display controller, a graphics processor, and/or a display device 604.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 600 may further include 10 devices such as devices 605-608, including network interface device(s) 605, optional input device(s) 606, and other optional 10 device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein. Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing read operations in a tiered data storage system, the method comprising:
    storing compressions regions in a data cache in a cache memory device, the compression regions containing data accessed by applications;
    determining that additional data related to data contained in any one or more of the compression regions is not yet present in the data cache;
    initiating a pre-fetch read of the additional data from a storage unit;
    completing the pre-fetch read for a hot region, the hot region characterized by compression regions containing any one or more of frequently and recently accessed data; and
    stopping the pre-fetch read for a cold region to avoid unnecessary disk Input/Output operations that would be incurred by completing the pre-fetch read, wherein the cold region is characterized by compression regions containing neither frequently nor recently accessed data.

2. The computer-implemented method of claim 1, wherein determining that additional data related to data contained in any one or more of the compression regions is not yet present in the data cache is based on metadata associated with the compression regions, including:
    receiving a reference for a compression region in a callback of a read operation for the compression region, the callback containing the reference as one or more contiguous references associated with data contained in the compression region;
    selecting metadata for the reference, the metadata including a fingerprint of the reference; and
    performing a cache-only lookup of the reference using the fingerprint to determine whether the additional data is not yet present in the data cache.

3. The computer-implemented method of claim 1, further comprising:
    monitoring a cache hit rate context of the pre-fetch read;
    determining that the cache hit rate context has met a threshold after which pre-fetch reads are throttled;
    stopping the pre-fetch read to avoid unnecessary disk Input/Output operations that would be incurred by completing the pre-fetch read.

4. The computer-implemented method of claim 3, wherein monitoring a cache hit rate context of the pre-fetch read includes:
    initializing a cache miss count and a cache hit count over a window of time;
    accumulating the cache miss count and the cache hit count over the window of time; and
    computing the cache hit rate context for the window of time based on a percentage of cache hit count relative to the cache miss count and the cache hit count combined.

5. The computer-implemented method of claim 3, wherein the threshold after which pre-fetch reads are throttled varies depending on any one or more of a disk I/O capacity of the tiered data storage system and a current cache hit rate context.

6. The computer-implemented method of claim 3, wherein the threshold after which pre-fetch reads are throttled varies depending on a temporal locality associated with the compression regions stored in the data cache, wherein a high temporal locality increases the threshold and a low temporal locality lowers the threshold.

7. The computer-implemented method of claim 1, wherein the cache memory device is any one of a solid-state device and a flash memory device.

8. A storage system for managing read operations in a tiered data storage system, comprising:
    a cache memory device having a data cache in which to store one or more compressions regions, the compression regions containing data accessed by applications;
    a cache manager executed by a processor to:
        determine that additional data related to data contained in any one or more of the compression regions is not yet present in the data cache;
        initiate a pre-fetch read of the additional data from a storage unit;
        complete the pre-fetch read for a hot region, the hot region characterized by compression regions containing any one or more of frequently and recently accessed data; and
        stop the pre-fetch read for a cold region to avoid unnecessary disk Input/Output operations that would be incurred by completing the pre-fetch read, wherein the cold region is characterized by compression regions containing neither frequently nor recently accessed data.

9. The storage system of claim 8, wherein to determine that additional data related to data contained in any one or more of the compression regions is not yet present in the data cache is based on metadata associated with the compression regions, the cache manager executed by the processor is further to:
    receive a reference for a compression region in a callback of a read operation for the compression region, the callback containing the reference as one or more contiguous references associated with data contained in the compression region;
    select metadata for the reference, the metadata including a fingerprint of the reference; and
    perform a cache-only lookup of the reference using the fingerprint to determine whether the additional data is not yet present in the data cache.

10. The storage system of claim 8, the cache manager executed by the processor is further to:
    monitor a cache hit rate context of the pre-fetch read;
    determine that the cache hit rate context has met a threshold after which pre-fetch reads are throttled; and
    stop the pre-fetch read to avoid unnecessary disk Input/Output operations that would be incurred by completing the pre-fetch read.

11. The storage system of claim 10, wherein to monitor a cache hit rate context of the pre-fetch read, the cache manager executed by the processor is further to:
    initialize a cache miss count and a cache hit count over a window of time;
    accumulate the cache miss count and the cache hit count over the window of time; and
    compute the cache hit rate context for the window of time based on a percentage of cache hit count relative to the cache miss count and the cache hit count combined.

12. The storage system of claim 10, wherein the threshold after which pre-fetch reads are throttled varies depending on any one or more of a disk I/O capacity of the tiered data storage system and a current cache hit rate context.

13. The storage system of claim 10, wherein the threshold after which pre-fetch reads are throttled varies depending on a temporal locality associated with the compression regions stored in the data cache, wherein a high temporal locality increases the threshold and a low temporal locality lowers the threshold.

14. The storage system of claim 10, wherein the cache memory device is any one of a solid-state device and a flash memory device.

15. A non-transitory computer-readable storage medium having instructions stored therein, which when executed by a processor, cause the processor to perform operations for managing read operations in a tiered data storage system, the operations comprising:
    storing compressions regions in a data cache in a cache memory device, the compression regions containing data accessed by applications;
    determining that additional data related to data contained in any one or more of the compression regions is not yet present in the data cache;
    initiating a pre-fetch read of the additional data from a storage unit;
    completing the pre-fetch read for a hot region, the hot region characterized by compression regions containing any one or more of frequently and recently accessed data; and
    stopping the pre-fetch read for a cold region to avoid unnecessary disk Input/Output operations that would be incurred by completing the pre-fetch read, wherein the cold region is characterized by compression regions containing neither frequently nor recently accessed data.

16. The non-transitory computer-readable storage medium of claim 15, wherein the operation for determining that additional data related to data contained in any one or more of the compression regions is not yet present in the data cache is based on metadata associated with the compression regions, further includes operations for:
    receiving a reference for a compression region in a callback of a read operation for the compression region, the callback containing the reference as one or more contiguous references associated with data contained in the compression region;
    selecting metadata for the reference, the metadata including a fingerprint of the reference; and
    performing a cache-only lookup of the reference using the fingerprint to determine whether the additional data is not yet present in the data cache.

17. The non-transitory computer-readable storage medium of claim 15, the operations comprising:
    monitoring a cache hit rate context of the pre-fetch read;
    determining that the cache hit rate context has met a threshold after which pre-fetch reads are throttled;
    stopping the pre-fetch read to avoid unnecessary disk Input/Output operations that would be incurred by completing the pre-fetch read.

18. The non-transitory computer-readable storage medium of claim 15, wherein the operation to monitor a cache hit rate context of the pre-fetch read further includes operations for:
    initializing a cache miss count and a cache hit count over a window of time;
    accumulating the cache miss count and the cache hit count over the window of time; and
    computing the cache hit rate context for the window of time based on a percentage of cache hit count relative to the cache miss count and the cache hit count combined.

19. The non-transitory computer-readable storage medium of claim 18, wherein the threshold after which pre-fetch reads are throttled varies depending on any one or more of a disk I/O capacity of the tiered data storage system and a current cache hit rate context.

20. The non-transitory computer-readable storage medium of claim 18, wherein the threshold after which pre-fetch reads are throttled varies depending on a temporal locality associated with the compression regions stored in the data cache, wherein a high temporal locality increases the threshold and a low temporal locality lowers the threshold.

* * * * *